(12) United States Patent
Le

(10) Patent No.: US 10,537,930 B1
(45) Date of Patent: Jan. 21, 2020

(54) AUTOMATIC MACHINING DEVICE FOR SHAFT BODY

(71) Applicant: NINGBO ZHENMING SHAFT CO., LTD, Ningbo, Zhejiang (CN)

(72) Inventor: Le Le, Zhejiang (CN)

(73) Assignee: NINGBO ZHENMING SHAFT CO., LTD, Ningbo (CN)

( * ) Notice: Subject to any disclaimer, the term of this patent is extended or adjusted under 35 U.S.C. 154(b) by 0 days.

(21) Appl. No.: 16/102,926

(22) Filed: Aug. 14, 2018

(30) Foreign Application Priority Data

Jul. 5, 2018 (CN) .......................... 2018 1 0728710

(51) Int. Cl.
*B26D 7/06* (2006.01)
*B26D 1/18* (2006.01)
*B23D 19/00* (2006.01)
*B21D 35/00* (2006.01)
*B23B 13/12* (2006.01)
*B23Q 7/04* (2006.01)

(52) U.S. Cl.
CPC .......... *B21D 35/005* (2013.01); *B23B 13/126* (2013.01); *B23Q 7/045* (2013.01)

(58) Field of Classification Search
CPC ............... B23Q 39/046; Y10T 83/7755; Y10T 29/5129; Y10T 83/219; Y10T 83/4455; Y10T 83/464; Y10T 83/0596; Y10T 83/531; Y10T 83/0448; Y10T 83/401; Y10T 83/0467; Y10T 83/16983; B21J 13/14; B23D 21/14; B26D 3/14; B26D 3/164; B21D 43/285; B65G 17/065
USPC ..... 83/162, 154, 483, 80, 42, 198, 104, 111, 83/196, 208, 363, 364, 367, 23, 54, 193, 83/27
See application file for complete search history.

(56) References Cited

U.S. PATENT DOCUMENTS

| 3,522,750 | A | * | 8/1970 | Shallenberg | ......... B21D 43/285 83/82 |
|---|---|---|---|---|---|
| 4,040,459 | A | * | 8/1977 | Bush, Jr. | .................... B07C 5/14 144/335 |
| 4,283,974 | A | * | 8/1981 | Kline | ...................... B21J 13/14 83/42 |
| 4,527,452 | A | * | 7/1985 | Lindner | ............... B23D 47/042 226/45 |
| 5,406,870 | A | * | 4/1995 | Suitts | .................... B23D 21/14 83/193 |
| 2004/0163512 | A1 | * | 8/2004 | Quigley | ................. B26D 3/161 83/27 |

* cited by examiner

*Primary Examiner* — Ghassem Alie

(57) ABSTRACT

An automatic machining device for shaft body includes a blank cutting mechanism and an automatic blank feed mechanism arranged at one side of the blank cutting mechanism, wherein, a machining platform is arranged at one side of the automatic blank feed mechanism, and a numerical control machine tool is arranged above the machining platform, thus realizing automatic cutting, feeding and machining of blanks.

4 Claims, 5 Drawing Sheets

AUTOMATIC MACHINING DEVICE FOR SHAFT BODY

CROSS-REFERENCE TO RELATED APPLICATIONS

The present application claims the benefit of Chinese Patent Application No. 201810728710.4 filed on Jul. 5, 2018. The contents of all the above are hereby incorporated by reference.

TECHNICAL FIELD

The invention relates to an automatic machining device for shaft body.

BACKGROUND

A shaft is a cylindrical object passing through the middle of a bearing, the middle of a wheel, or the middle of a gear. In the machining process of shafts, steel bars are cut and blanked in equal length since the bars are machined in batch with the same specifications. For enterprises, a goal for improvement is to achieve automatic blanking for shafts. However, traditional blanking methods such as manual blanking and semi-automatic blanking with tools fail to reach a high blanking efficiency. So, the purpose of the application is to further improve the blanking efficiency.

Steel bars are cut into blanks and transported to a machining platform for subsequent process. In the machining process, blanks are transported step by step. Nowadays, blanks in the storage box are transported to the machining platform one by one, where they will be machined manually. This not only takes much time but also affects the shaft machining effect.

SUMMARY OF THE INVENTION

The purpose of the invention is provide an automatic machining device for shaft body to solve the defects of the prior art.

In order to achieve the purpose, the invention is realized by the following technical scheme:

The invention provides an automatic machining device for shaft body, comprising a blank cutting mechanism and an automatic blank feed mechanism arranged at one side of the blank cutting mechanism, wherein, a machining platform is arranged at one side of the automatic blank feed mechanism, a numerical control machine tool is arranged above the machining platform, the blank cutting mechanism comprises a cutting table, a cutting guide box is arranged on the cutting table, a sliding guide plate is arranged at the bottom of the cutting guide box, a guide groove is arranged on the surface of the sliding guide plate, two ends of the cutting guide box are opened, and multiple cuts are arranged on the cutting guide box;

a horizontal guide frame is arranged above the cutting table, a horizontal sliding mechanism is arranged on the horizontal guide frame, and the horizontal sliding mechanism is connected to a cutting assembly; the horizontal sliding mechanism comprises an upper guide rail groove arranged on the upper surface of the horizontal guide frame and a lower guide rail groove arranged on the lower surface of the horizontal guide frame; wherein, an upper driving wheel is arranged in the upper guide rail groove, a lower guiding wheel is arranged in the lower guide rail groove, the upper driving wheel and the lower guiding wheel are respec- tively connected to the sliding box through a connecting shaft, the lower guiding wheel is rotationally connected to the connecting shaft, a drive motor is arranged at one side of the sliding box, and the drive motor is connected to the connecting shaft of the upper driving wheel;

the cutting assembly comprises a cutting cylinder fixed at the bottom of the sliding box, a rod of the cutting cylinder is connected to a holder, a cutting wheel is mounted on the holder, a micro motor is fixed at one side of the holder, and the micro motor is connected to an mounting shaft in the middle of the cutting wheel;

the automatic blank feed mechanism comprises a blank feed box arranged at one side of the cutting table, wherein, a baffle is arranged in the blank feed box, one end of the baffle is connected to the top of the inner side of the blank feed box, and the other end of the baffle is spaced from the bottom of the blank feed box to form a guide port, and the baffle divides the inner cavity of the blank feed box into a material storage cavity and a material guide cavity;

a guide plate is slantwise arranged in the material storage cavity, one end of the guide plate is close to the guide port, the material guide cavity is internally provided with a lifting guide plate, a detachable shaft blank support plate is arranged at the end of the lifting guide plate, the shaft blank support plate is provided with an accommodating groove, the blank feed box is provided with a discharge port in communication with the material guide cavity, and the discharge port is positioned directly above the accommodating groove;

the tail end of the lifting guide plate penetrates out of the bottom of the material guide cavity, an accessory box is arranged at the bottom of the blank feed box, an cylinder is fixed in the accessory box, and an rod of the cylinder is connected to the tail end of the lifting guide plate;

a push plate is arranged at the discharge port side at the top of the blank feed box, and the back surface of the push plate is connected to a push cylinder.

In the automatic machining device for shaft body, the cut extends to the bottom of the guide groove.

In the automatic machining device for shaft body, one side of the blank feed box is provided with a feed port in communication with the material storage cavity, a movable door is arranged at the feed port, and one end of the movable door is hinged with the blank feed box.

In the automatic machining device for shaft body, a connecting plate is arranged at the end of the lifting guide plate, a connecting groove is arranged at the bottom of the shaft blank support plate, and the connecting groove is engaged with the connecting plate, and one side of the lifting guide plate is fixedly connected to the shaft blank support plate through bolts.

The beneficial effects of the invention are as follows: when the device is in service, a long blank is stretched into the cutting guide box, and the upper driving wheel rotates under the action of the drive motor, thereby driving the sliding box to move at one side of the horizontal guide frame. And the cutting assembly at the bottom of the sliding box moves horizontally along with the sliding box. When the cutting assembly is positioned directly above the cut, the cutting cylinder drives the holder to move downwards. As a result, the cutting wheel on the holder extends into the cut. The micro motor drives the cutting wheel to rotate at high speed to cut the long blank into short blanks in the cutting guide box; then the cutting cylinder drives the holder to move upwards, and the drive motor drives the cutting assembly to further move horizontally to finish the next cutting step. After the cutting process is completed, the long blank is manually pushed, and the long blank cut into short blanks can be pushed out of the port of the cutting guide box to finish the cutting work. The device has high cutting efficiency and the long blank is cut at equal intervals.

When the cutting procedure is finished, the movable door is opened, and the long blank cut into short blanks can be placed into the material storage cavity. Now, the lifting guide plate is driven by the cylinder to descend to the bottom of the material guide cavity; whereas the blank in the material storage cavity rolls into the material guide cavity through the guide port and is located in the mounting groove at the end of the lifting guide plate. Meanwhile, the cylinder drives the lifting guide plate to rise and extend out of the discharge port at the top of the material guide cavity, and the push cylinder drives the push plate to move and pushes the blanks at the top of the lifting guide plate onto the machining platform for further machining.

DETAILED DESCRIPTION OF THE PREFERRED EMBODIMENT

Figure 1:
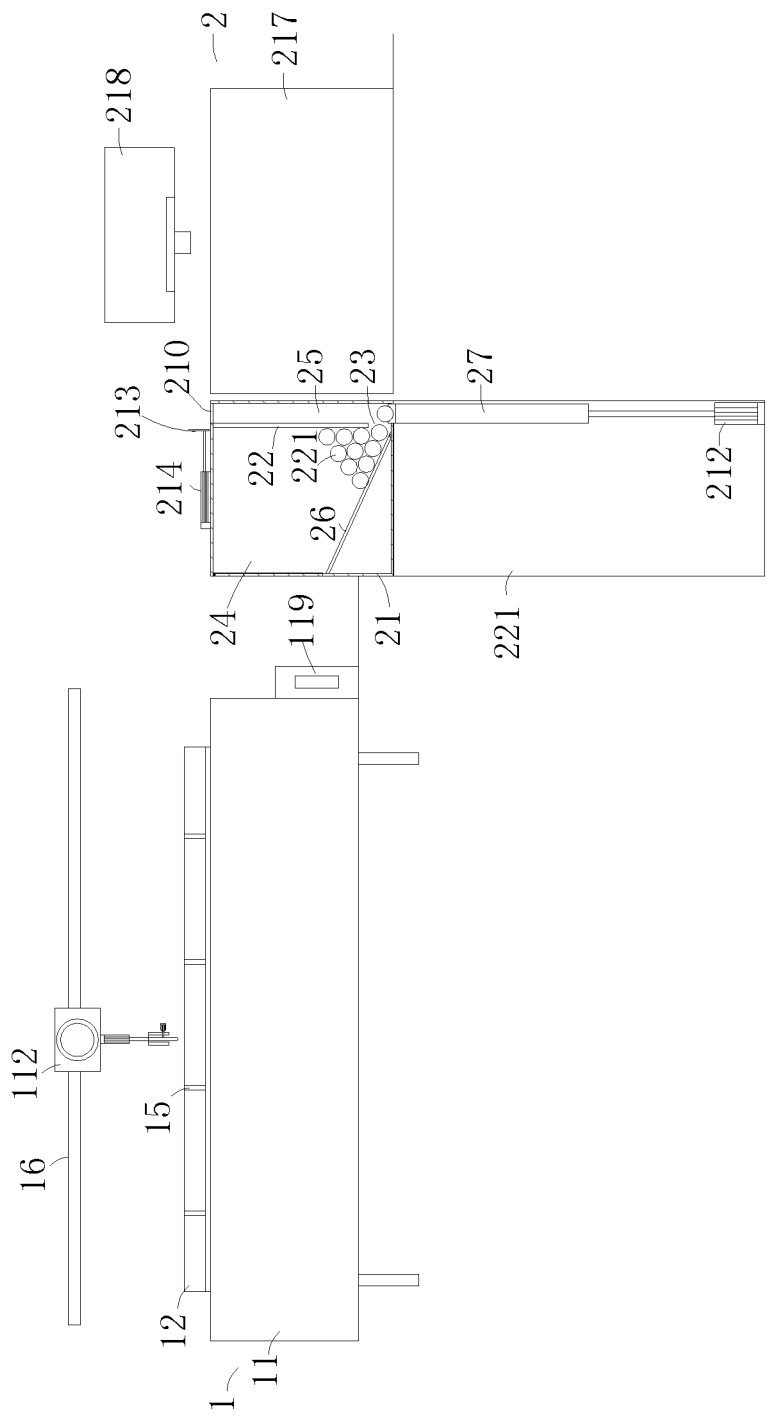
FIG. 1 is a structural diagram of the invention.
Figure 2:
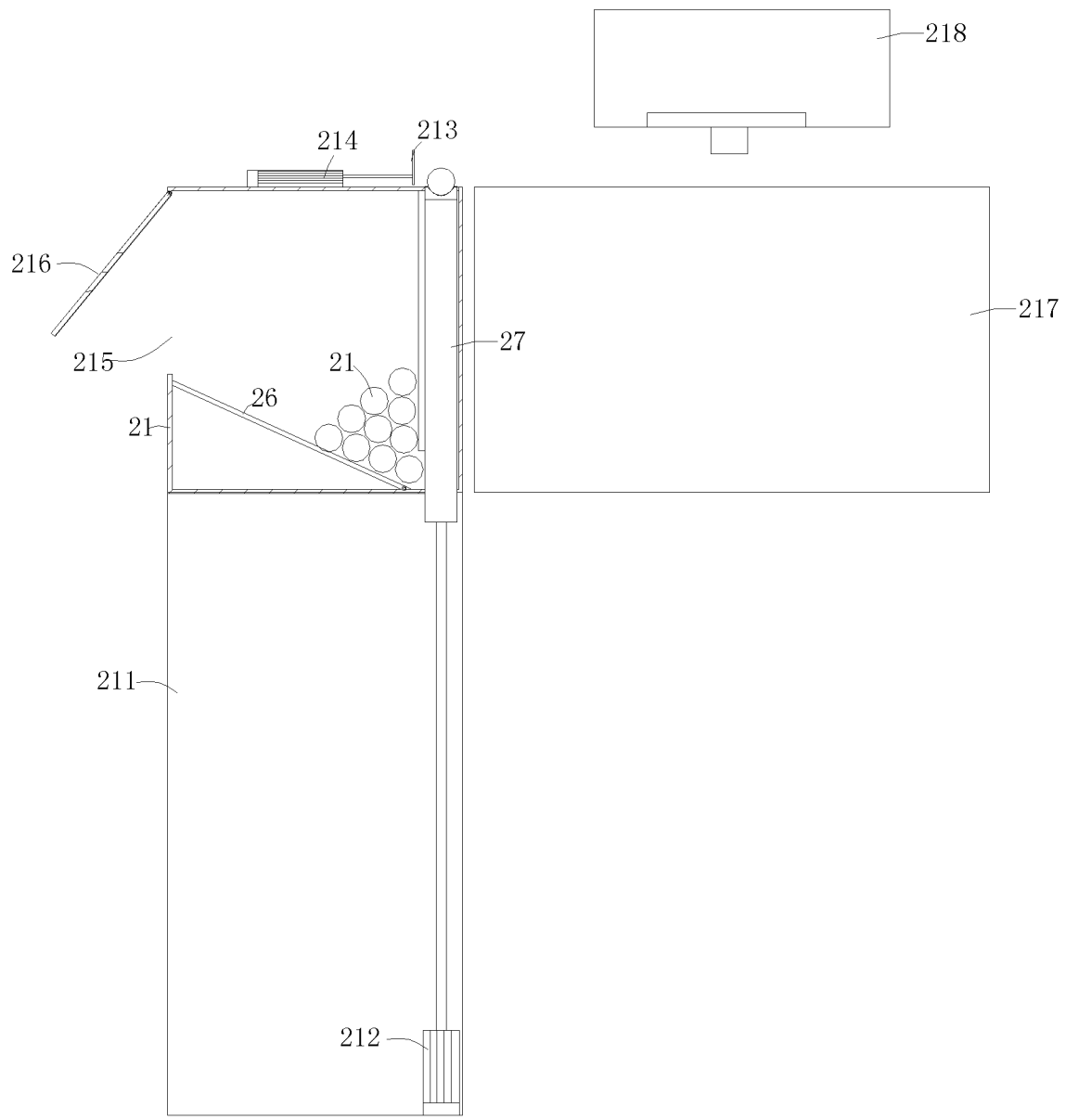
FIG. 2 is a schematic diagram of the blank feed box of the invention when feeding blanks.
Figure 3:
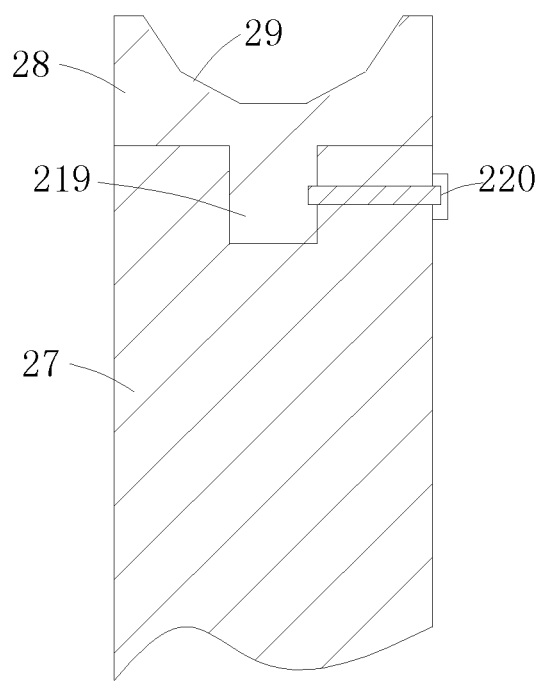
FIG. 3 is a schematic diagram of the connection between the shaft blank support plate and the lifting guide plate.
Figure 4:
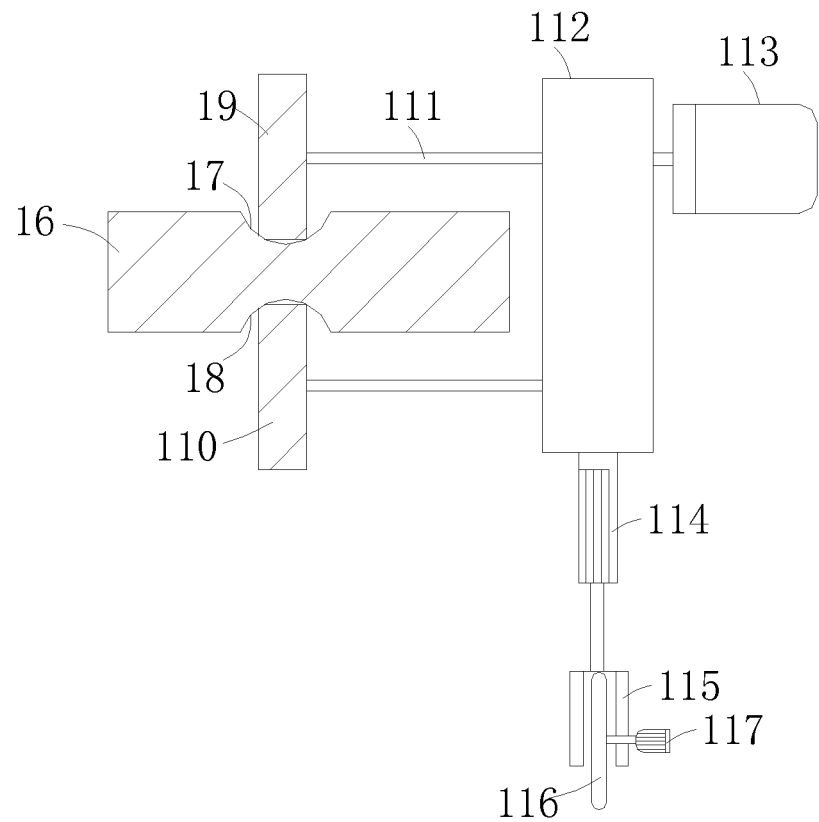
FIG. 4 is a schematic diagram of the horizontal sliding mechanism and cutting assembly of the invention.
Figure 5:
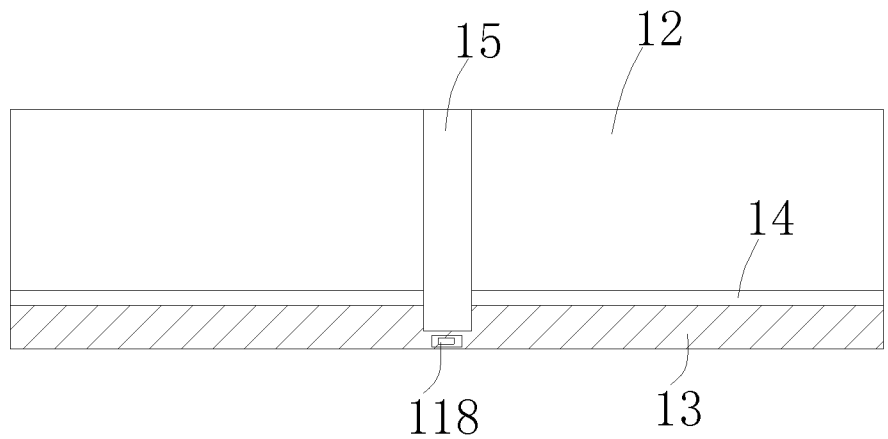
FIG. 5 is a schematic diagram of the cutting guide box of the invention.
Figure 6:
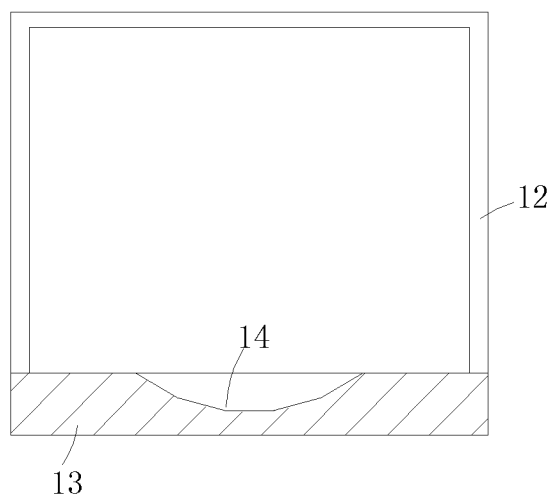
FIG. 6 is a sectional view of the cutting guide box of the invention.

As shown in FIG. 1 to FIG. 6, an automatic machining device for shaft body comprises a blank cutting mechanism 1 and an automatic blank feed mechanism 2 arranged at one side of the blank cutting mechanism 1, wherein, a machining platform 217 is arranged at one side of the automatic blank feed mechanism 2, and a numerical control machine tool 218 is arranged above the machining platform 217; the blank cutting mechanism 1 comprises a cutting table 11, a cutting guide box 12 is arranged on the cutting table 11, a sliding guide plate 13 is arranged at the bottom of the cutting guide box 12, a guide groove 14 is arranged on the surface of the sliding guide plate 13, two ends of the cutting guide box 12 are opened, and multiple cuts 15 are arranged on the cutting guide box 12 and arranged at equal intervals;

a horizontal guide frame 16 is arranged above the cutting table 11, a horizontal sliding mechanism is arranged on the horizontal guide frame 16, and the horizontal sliding mechanism is connected to the cutting assembly;

the horizontal sliding mechanism comprises an upper guide rail groove 17 arranged on the upper surface of the horizontal guide frame 16 and a lower guide rail groove 18 arranged on the lower surface of the horizontal guide frame 16; wherein, an upper driving wheel 19 is arranged in the upper guide rail groove 17, a lower guiding wheel 110 is arranged in the lower guide rail groove 18, the upper driving wheel 19 and the lower guiding wheel 110 are connected to the sliding box 112 through a connecting shaft 111, a drive motor 113 is arranged at one side of the sliding box 112, and the drive motor 113 is connected to the connecting shaft of the upper driving wheel 19;

the cutting assembly comprises a cutting cylinder 114 fixed at the bottom of the sliding box 112, a rod of the cutting cylinder 114 is connected to a holder 115, a cutting wheel 116 is mounted on the holder 115, a micro motor 117 is fixed at one side of the holder 115, and the micro motor 117 is connected to an mounting shaft in the middle of the cutting wheel 116;

In the invention, the cut 15 extends to the bottom of the guide groove 14; the guide groove 14 extends in the longitudinal direction of the sliding guide plate 13; the upper guide rail groove 17 and the lower guide rail groove 18 extend in the longitudinal direction of the horizontal guide frame 16.

The sliding guide plate 13 is provided with a positioner 118 at the bottom of the cut 15, a controller 119 is arranged at one side of the cutting table 11, and a control chip is installed in the controller 119 and is connected to the drive motor 113 and the positioner 118 respectively. The model of the control chip is LM628. The positioner 118 can ensure that the drive motor 113 stops directly above the cut 15. The specific control mode of the drive motor 113 is mainly completed by the control chip, which is not detailed in this patent. This technology belongs to the prior art and this patent is mainly a structural innovation.

the automatic blank feed mechanism 2 comprises a blank feed box 21, wherein, a baffle 22 is arranged in the blank feed box 21, one end of the baffle 22 is connected to the top of the inner side of the blank feed box 21, and the other end of the baffle 22 is spaced from the bottom of the blank feed box 21 to form a guide port 23, and the baffle 22 divides the inner cavity of the blank feed box 21 into a material storage cavity 24 and a material guide cavity 25;

a guide plate 26 is slantwise arranged in the material storage cavity 24, one end of the guide plate 26 is close to the guide port 23, the material guide cavity 25 is internally provided with a lifting guide plate 27, the end of the lifting guide plate 27 is provided with a detachable shaft blank support plate 28, the shaft blank support plate 28 is provided with an accommodating groove 29, the blank feed box 21 is provided with a discharge port 210 in communication with the material guide cavity 25, and the discharge port 210 is positioned directly above the accommodating groove 29;

the tail end of the lifting guide plate 27 penetrates out of the bottom of the material guide cavity 25, the bottom of the blank feed box 21 is provided with an accessory box 211, an cylinder 212 is fixed in the accessory box 211, and an rod of the cylinder 212 is connected to the tail end of the lifting guide plate 27;

a push plate 213 is arranged at the discharge port 210 side at the top of the blank feed box 21, and the back surface of the push plate 213 is connected to a push cylinder 214.

one side of the blank feed box 21 is provided with a feed port 215 in communication with the material storage cavity 24, a movable door 216 is arranged at the feed port 215, and one end of the movable door 216 is hinged with the blank feed box 21.

In the invention, the width of the lifting guide plate 27 is the same as that of the material guide cavity 25, a machining platform 217 is arranged at one side of the blank feed box 21, a numerical control machine 218 is arranged above the machining platform 217, a connecting plate 219 is arranged at the end of the lifting guide plate 27, a connecting groove is arranged at the bottom of the shaft blank support plate 28 and engaged with the connecting plate 219, and one side of the lifting guide plate 27 is fixedly connected to the shaft blank support plate 28 through bolts 220.

When the device is in service, a long blank is stretched into the cutting guide box 12, and the upper driving wheel 19 rotates under the action of the drive motor 113, thereby driving the sliding box 112 to move at one side of the horizontal guide frame 16. And the cutting assembly at the bottom of the sliding box 112 moves horizontally along with the sliding box 112. When the cutting assembly is positioned directly above the cut 15, the cutting cylinder 114 drives the holder 115 to move downwards. As a result, the cutting wheel 116 on the holder 115 extends into the cut 15. The micro motor 117 drives the cutting wheel 116 to rotate at high speed to cut the long blank into short blanks in the cutting guide box 12; then the cutting cylinder drives the holder to move upwards, and the drive motor drives the cutting assembly to further move horizontally to finish the next cutting step. After the cutting process is completed, the long blank is manually pushed, and the long blank cut into short blanks can be pushed out of the port of the cutting guide box 12 to finish the cutting work. The device has high cutting efficiency and the long blank is cut at equal intervals. Feeding work can be performed manually or with the help of a mechanical arm.

When the cutting procedure is finished, the movable door 216 is opened, and the long blank 221 cut into short blanks can be placed into the material storage cavity 24. Now, the lifting guide plate 27 is driven by the cylinder 212 to descend to the bottom of the material guide cavity 25; whereas the long blank 221 cut into short blanks in the material storage cavity 24 rolls into the material guide cavity 25 through the guide port 23 and is located in the mounting groove 29 at the end of the lifting guide plate 27. Meanwhile, the cylinder 212 drives the lifting guide plate 27 to rise and extend out of the discharge port 210 at the top of the material guide cavity 25, and the push cylinder 214 drives the push plate 213 to move and pushes the blanks at the top of the lifting guide plate 27 onto the machining platform 217 for further machining.

The fundamental principles, main features and advantages of the invention have been shown and described above. It should be understood by those skilled in the art that the invention is not limited to the above examples, the examples in the specification only describe the principle of the invention, and various changes and improvements can be made to the invention without departing from spirit and scope of the invention, and the changes and improvements shall fall into the protection scope of the invention. The protection scope of the invention is defined by the appended claims and their equivalents.

The invention claimed is:

1. An automatic machining device for shaft body, comprising a blank cutting mechanism and an automatic blank feed mechanism arranged at one side of the blank cutting mechanism, wherein, a machining platform is arranged at one side of the automatic blank feed mechanism, and a numerical control machine tool is arranged above the machining platform; and wherein the blank cutting mechanism comprises a cutting table, wherein, a cutting guide box is arranged on the cutting table, a sliding guide plate is arranged at a bottom of the cutting guide box, a guide groove is arranged on a surface of the sliding guide plate, two ends of the cutting guide box are opened, and multiple cuts are arranged on the cutting guide box;

a horizontal guide frame is arranged above the cutting table, a horizontal sliding mechanism is arranged on the horizontal guide frame, and the horizontal sliding mechanism is connected to a cutting assembly; the horizontal sliding mechanism comprises an upper guide rail groove arranged on an upper surface of the horizontal guide frame and a lower guide rail groove arranged on a lower surface of the horizontal guide frame; wherein, an upper driving wheel is arranged in the upper guide rail groove, a lower guiding wheel is arranged in the lower guide rail groove, the upper driving wheel and the lower guiding wheel are respectively connected to the sliding box through a connecting shaft, the lower guiding wheel is rotationally connected to the connecting shaft, a drive motor is arranged at one side of the sliding box, and the drive motor is connected to the connecting shaft of the upper driving wheel;

the cutting assembly comprises a cutting cylinder fixed at a bottom of the sliding box, a rod of the cutting cylinder is connected to a holder, a cutting wheel is mounted on the holder, a micro motor is fixed at one side of the holder, and the micro motor is connected to an mounting shaft in a middle of the cutting wheel;

the automatic blank feed mechanism comprises a blank feed box arranged at one side of the cutting table, wherein, a baffle is arranged in the blank feed box, one end of the baffle is connected to a top of an inner side of the blank feed box, and an other end of the baffle is spaced from a bottom of the blank feed box to form a guide port, and the baffle divides an inner cavity of the blank feed box into a material storage cavity and a material guide cavity;

a guide plate is slantwise arranged in the material storage cavity, one end of the guide plate is close to the guide port, the material guide cavity is internally provided with a lifting guide plate, a detachable shaft blank support plate is arranged at an end of the lifting guide plate, the shaft blank support plate is provided with an accommodating groove, the blank feed box is provided with a discharge port in communication with the material guide cavity, and the discharge port is positioned directly above the accommodating groove;

a tail end of the lifting guide plate penetrates out of a bottom of the material guide cavity, an accessory box is arranged at the bottom of the blank feed box, an cylinder is fixed in the accessory box, and an rod of the cylinder is connected to the tail end of the lifting guide plate;

a push plate is arranged at the discharge port side at a top of the blank feed box, and a back surface of the push plate is connected to a push cylinder.

2. The automatic machining device for shaft body according to claim 1, wherein a cut extends to a bottom of the guide groove.

3. The automatic machining device for shaft body according to claim 1, wherein one side of the blank feed box is provided with a feed port in communication with the material storage cavity, a movable door is arranged at the feed port, and one end of the movable door is hinged with the blank feed box.

4. The automatic machining device for shaft body according to claim 1, wherein a connecting plate is arranged at the end of the lifting guide plate, a connecting groove is arranged at a bottom of the shaft blank support plate, and the connecting groove is engaged with the connecting plate, and one side of the lifting guide plate is fixedly connected to the shaft blank support plate through bolts.

\* \* \* \* \*